Figure 1:
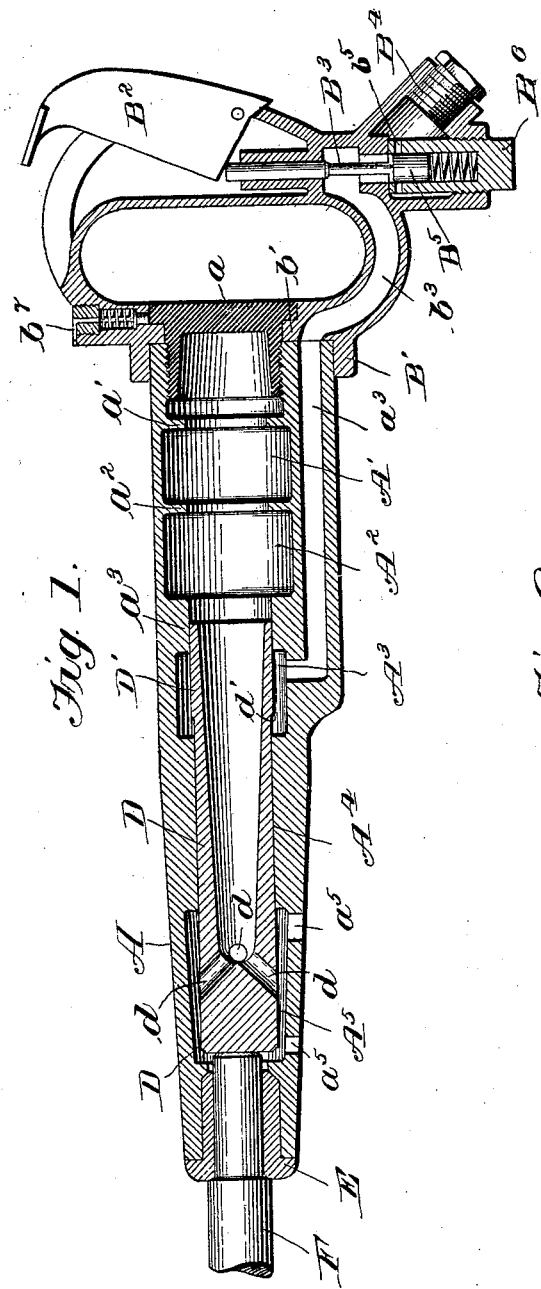

No. 711,425. Patented Oct. 14, 1902.
C. H. JOHNSON.
FLUID PRESSURE OPERATED TOOL.
(Application filed Jan. 20, 1902.)

(No Model.)

Witnesses:
Inventor:

UNITED STATES PATENT OFFICE.

CHARLES HARRIS JOHNSON, OF CHICAGO, ILLINOIS.

FLUID-PRESSURE-OPERATED TOOL.

SPECIFICATION forming part of Letters Patent No. 711,425, dated October 14, 1902.

Application filed January 20, 1902. Serial No. 90,469. (No model.)

*To all whom it may concern:*

Be it known that I, CHARLES HARRIS JOHNSON, a citizen of the United States, residing at Chicago, county of Cook, State of Illinois, have invented a certain new and useful Improvement in Fluid-Pressure-Operated Tools; and I declare the following to be a full, clear, and exact description of the invention, such as will enable others skilled in the art to which it pertains to make and use the same, reference being had to the accompanying drawings, which form a part of this specification.

My invention relates in general to fluid-pressure-operated tools, and more particularly to pneumatic hammers of the valveless type.

In fluid-pressure-operated tools as ordinarily constructed the piston delivers a blow upon a snap or the shank of a tool, the initial propulsion of the piston toward the tool being due to the flow of fluid-pressure from the source of motive-fluid supply, while the final portion of the stroke is due to the expansion of the fluid within the cylinder after it has been cut off from the source of fluid-pressure supply. Fluid-pressure-operated tools have also been constructed heretofore in which impetus is given to the stroke of the piston toward the tool by the expansion of pressure into the working end of the cylinder from a single reservoir, which has been charged during the throw of the piston away from the tool. It is obvious, however, that in a tool so constructed the greatest impetus is given to the piston at the instant the reservoir communicates with the working end of the cylinder and that during the remainder of the stroke of the piston toward the tool the pressure diminishes by expansion into the cylinder.

The primary object of my invention is to produce a fluid-pressure-operated tool in which the initial stroke of the piston toward the tool is effected by the admission of pressure from the source of motive fluid, while the piston is given an additional impetus at a plurality of successive points in its stroke.

A further object of my invention is to provide a fluid-pressure-operated tool which will be simple in construction and efficient in operation.

My invention, generally stated, consists in providing a fluid-pressure-operated tool with a plurality of reservoirs which successively discharge into the working end of the cylinder during the stroke of the piston toward the tool.

My invention further consists in a fluid-pressure-operated tool comprising a cylinder, a reciprocating piston therein, and a plurality of reservoirs which are successively charged during the throw of the piston away from the tool prior to the admission of pressure to the working end of the cylinder and which successively discharge into the cylinder during the stroke of the piston toward the tool.

My invention will be more fully described hereinafter with reference to the accompanying drawings, in which the same is illustrated as embodied in a convenient and practical form, and in which—

Figure 2:
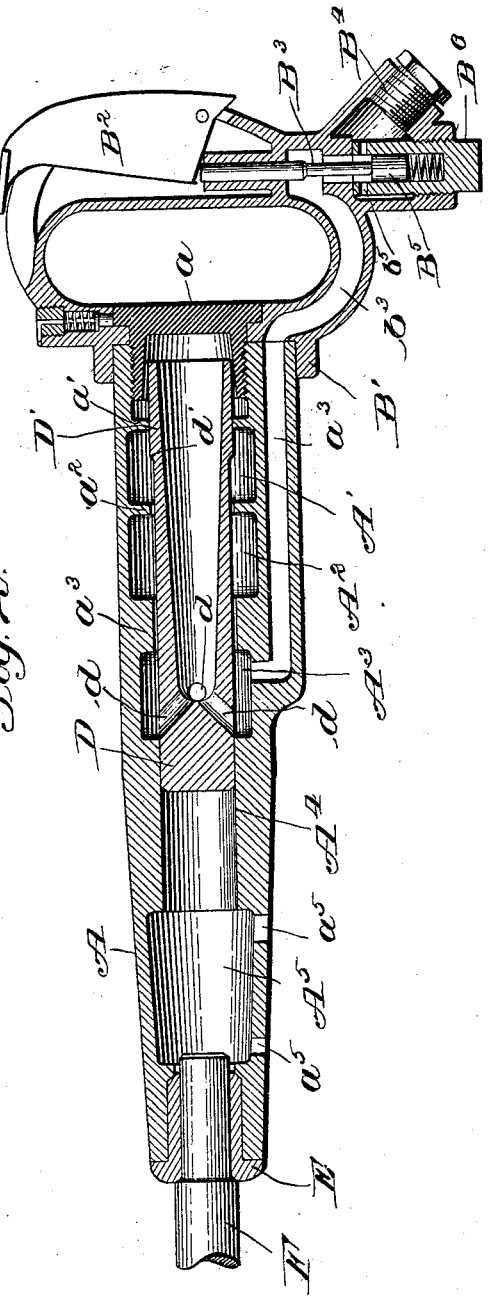

Figure 1 is a longitudinal section through a tool embodying my invention, showing the piston delivering a blow upon the tool; and Fig. 2 is a similar view showing the piston at the beginning of its stroke toward the tool.

The same reference characters are used in the two figures of the drawings to indicate the same parts.

Reference-letter A indicates a cylinder, within which the piston D reciprocates. A handle B is secured to one end of the cylinder in any suitable manner. In the present instance a flange B' overlaps the end of the cylinder and is held in such position by a cap $a$, which is provided with a screw-threaded tubular portion in engagement with the interior surface of the end of the cylinder. A flange $b'$, formed on the handle B, is interposed between the head of the cap $a$ and the end of the cylinder A. Any suitable means may be provided for retaining the cap $a$ from rotation with respect to the handle, such means being shown as consisting in a spring-actuated bolt $b^7$, engaging with ratchet-teeth on the rim of the cap $a$.

A throttle-valve $B^5$ is located within a valve-seat $B^6$, which is screwed into a tubular extension on the handle B and controls ports $b^5$ through the valve-seat.

$B^4$ indicates a coupling to which a pipe leading from the motive-fluid supply is secured.

$B^3$ indicates a reciprocating spindle which at one end engages the throttle-valve $B^5$ and at its other end is engaged by a hand-operated lever $B^2$, pivotally mounted in the handle B.

$b^3$ indicates a passage in the handle B, communicating at one end with a passage controlled by the throttle-valve and its other end in register with a passage $a^3$ in the cylinder A. An annular chamber $A^3$, formed in the cylinder, communicates with the other end of the passage $a^3$. A chamber $A^5$ is provided in the end of the cylinder opposite to the handle B, such chamber communicating with the atmosphere through exhaust-ports $a^5$. A ferrule E is fitted within the end of the cylinder adjacent to the chamber $A^5$, in which a die or snap or the shank of a tool F is located. A plurality of chambers $A'$ and $A^2$, preferably annular in form, are provided within the cylinder by enlarging the bore thereof between the supply-chamber $A^3$ and the cap $a$. A partition $a^3$ separates the supply-chamber $A^3$ from the chamber $A^2$, while a second partition $a^2$ is interposed between the chambers $A^2$ and $A'$. A third partition $a'$ is interposed between the chamber $A'$ and the end of the cylinder, within which is located the screw-threaded portion of the cap $a$. The chambers $A'$ and $A^2$ serve as reservoirs, which are successively charged with pressure from motive-fluid source during the stroke of the piston away from the tool and before the admission of pressure to the working end of the cylinder. The diameter of the enlarged portion $D'$ of the piston is substantially the same as the bore through the partitions $a'$, $a^2$, and $a^3$, and the length of the enlarged portion $D'$ between the shoulder $d'$ and the large end of the piston is slightly greater than the length of each of the reservoirs $A^2$ and $A'$.

The piston D is of a differential type and is provided with a shoulder $d'$, formed between the main portion of the piston and the enlarged end thereof, $D'$. The piston is preferably hollow and provided with ports $d$, extending from the interior thereof to the outer surface and located adjacent to the end of the piston opposite to the enlarged portion $D'$. The reduced portion of the piston D is of such a diameter as to closely fit the inner surface of the portion $A^4$, which extends between the annular chamber $A^3$ and exhaust-chamber $A^5$.

The operation of my improved fluid-pressure-operated tool is as follows: The handle-lever $B^2$ is depressed, as indicated in Fig. 2, which through the interposed spindle $B^3$ depresses the throttle-valve $B^5$, so that the latter uncovers the ports $b^5$. Motive fluid consequently flows from the source thereof through the coupling $B^4$, thence through the ports $b^5$ to the passage $b^3$, which registers with the passage $a^3$, which in turn communicates with the annular chamber $A^3$. The piston D being in the position indicated in Fig. 1, the motive fluid is exerted upon the shoulder $d'$ and causes the piston to move toward the handle, inasmuch as the larger end of the piston and also the cylinder and chambers $A'$ and $A^2$ therein are in communication with the atmosphere through the piston, ports $d$, the chamber $A^5$, and the ports $a^5$. When in the movement of the piston toward the handle the enlarged portion $D'$ passes beyond the partition $a^3$, fluid-pressure is admitted around the reduced portion of the piston into the reservoir $A^2$ and charges the same. A continuation of the movement of the piston toward the handle charges the reservoir $A'$ upon the shoulder $d'$, passing beyond the partition $a^2$. The piston continues in its stroke toward the handle B until the ports $d$ register with the annular chamber $A^3$, as illustrated in Fig. 2, at which time motive fluid is admitted through the ports $d$ to the interior of the piston and thence to the working end of the cylinder. The greater area of the larger end of the piston is consequently subjected to pressure and the piston immediately commences its stroke toward the tool. The communication with the motive fluid is cut off as soon as the ports $d$ pass out of register with the annular chamber $A^3$, which occurs before the enlarged end $D'$ of the piston passes beyond the partition $a'$. As soon as the partition $a'$ is passed by the piston the pressure which has been stored in the reservoir, consisting in the chamber $A'$, discharges into the working end of the cylinder and adds impetus to the stroke of the piston. When the piston passes beyond the partition $a^2$, the reservoir $A^2$ communicates with the working end of the cylinder and adds impetus to the stroke of the piston by the expansion of the fluid-pressure which has been stored therein. Upon the ports $d$ being uncovered by the chamber $A^5$ the working end of the cylinder exhausts through the ports $a^5$ and the stroke of the piston in the opposite direction—namely, toward the handle—commences, by reason of the motive fluid being exerted upon the shoulder $d'$.

From the foregoing description it will be observed that the stroke of the piston toward the tool is commenced by motive fluid admitted through the piston to the working end of the cylinder, while the stroke of the piston during that portion of its travel when the ports $d$ are closed by the restricted interior surface $A^4$ of the cylinder is effected not merely by the expansion of the motive fluid which has been admitted directly to the working end of the cylinder from the supply, but also by the expansion into the cylinder successively of the motive fluid which has been charged in the plurality of reservoirs, preferably prior to the admission of the motive fluid from the supply to the cylinder. By successively connecting the reservoirs with the supply during the interval of time occupied by the shoulder $d'$ of the piston passing from the partition $a^3$ to the end of the piston-stroke the reservoirs are completely charged directly from the supply and only discharge into the working end of the cylinder after the stroke of the piston toward the tool has commenced by the admission of motive fluid through the ports $d$ to the working end of the cylinder. It is also evident that by admitting the motive fluid through the relatively large ports $d$ to the working end of the cylinder the entire expansibility of the fluid is utilized to impart initial movement to the piston and is not diminished by expansion from the working end of the cylinder into the reservoirs.

It is obvious that a greater number of reservoirs than two may, if desired, be utilized to add impetus to the stroke of the piston toward the tool by successively discharging into the working end of the cylinder.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a fluid-pressure-operated tool, the combination with a cylinder, of a reciprocating piston therein, means for imparting an initial movement to said piston toward the tool, and means for adding impetus to the piston at a plurality of successive points in its stroke.

2. In a fluid-pressure-operated tool, the combination with a cylinder, of a reciprocating piston therein, means for admitting fluid-pressure to the working end of the cylinder to impart an initial movement to said piston, a plurality of reservoirs, and means for successively discharging said reservoirs into the working end of the cylinder.

3. In a fluid-pressure-operated tool, the combination with a cylinder, of a reciprocating piston therein, a plurality of reservoirs, means for successively charging said reservoirs during the throw of a piston away from the tool and successively discharging said reservoirs into the working end of the cylinder during the stroke of the piston toward the tool.

4. In a fluid-pressure-operated tool, the combination with a cylinder, of a reciprocating piston therein, means for admitting fluid-pressure to the working end of the cylinder from a supply source, a plurality of reservoirs, means for successively charging said reservoirs during the throw of the piston away from the tool prior to the admission of pressure to the working end of the cylinder and successively discharging said reservoirs into the working end of the cylinder after the motive-fluid supply has been cut off therefrom.

5. In a fluid-pressure-operated tool, the combination with a cylinder, of a reciprocating piston therein, a plurality of reservoirs connected with the fluid-pressure supply by the piston during its throw away from the tool and successively connected with the working end of the cylinder by the piston during its stroke toward the tool.

6. In a fluid-pressure-operated tool, the combination with a cylinder having its bore enlarged to form a plurality of reservoirs, of a reciprocating piston successively connecting said reservoirs with the source of fluid-pressure during its throw away from the tool and successively connecting said reservoirs with the working end of the cylinder during its stroke toward the tool.

7. In a fluid-pressure-operated tool, the combination with a cylinder having the bore thereof enlarged to form a supply-chamber and a plurality of reservoirs, of annular partitions between said supply-chamber and the adjacent reservoir and between said reservoirs respectively, a reciprocating piston within said cylinder, and an enlargement on said piston closely engaging said annular partitions and adapted to successively pass beyond the same during the stroke of the piston away from the tool thereby connecting said reservoirs in turn with said supply-chamber.

8. In a fluid-pressure-operated tool, the combination with a cylinder having the bore thereof enlarged to form supply and exhaust chambers and a plurality of reservoirs, of annular partitions between said chambers and said reservoirs respectively, a hollow piston within said cylinder having ports leading from its outer surface to the interior thereof, an enlargement on said piston of a greater length than the length of each of said reservoirs whereby said reservoirs are successively connected with said supply-chamber prior to the admission of pressure from said supply-chamber through the ports and hollow interior of said piston to the working end of the cylinder.

9. In a fluid-pressure-operated tool, the combination with a cylinder having the bore thereof enlarged to form supply and exhaust chambers and a plurality of reservoirs, of an annular partition between said supply and exhaust chambers, a second annular partition between said supply-chamber and the adjacent reservoir, a hollow differential piston having a reduced portion fitting the bore of the first partition and an enlarged portion fitting the bore of the second partition said reduced portion having ports leading to the hollow interior of the piston and said enlarged portion being of a greater length than the length of the reservoir adjacent to the handle of the tool whereby said reservoirs are connected with said supply-chamber prior to the admission of pressure from said supply-chamber through the ports and hollow interior of said piston to the working end of the cylinder.

In testimony whereof I sign this specification in the presence of two witnesses:

CHARLES HARRIS JOHNSON.

Witnesses:
H. H. VAUGHAN,
B. C. WIEDERHOLD.